United States Patent [19]

Capuano

[11] 4,347,636

[45] Sep. 7, 1982

[54] NUT AND METHOD OF FORMING THE SAME

[75] Inventor: Terry D. Capuano, Hinckley, Ohio

[73] Assignee: Lamson & Sessions Co., Cleveland, Ohio

[21] Appl. No.: 92,228

[22] Filed: Nov. 7, 1979

[51] Int. Cl.³ .............................................. B21D 53/24
[52] U.S. Cl. ...................................................... 10/86 F
[58] Field of Search ................. 85/32 V; 10/85, 86 R, 10/86 F, 75, 77, 78

[56] References Cited

U.S. PATENT DOCUMENTS

| | | | |
|---|---|---|---|
| 689,555 | 12/1901 | Mann et al. | 85/32 V |
| 800,190 | 9/1905 | Ward | 85/32 V |
| 2,832,972 | 5/1958 | Richards | 10/86 F |
| 2,870,465 | 1/1959 | Kraus et al. | |
| 3,314,326 | 4/1967 | Bedford, Jr. | 85/32 V |
| 3,683,438 | 8/1972 | Tinnerman | |
| 3,748,674 | 7/1973 | Powell et al. | |
| 3,775,790 | 12/1973 | Tinnerman | 10/86 F |

FOREIGN PATENT DOCUMENTS

2408054  2/1974  Fed. Rep. of Germany .
2514038  3/1975  Fed. Rep. of Germany .
2651332 11/1976  Fed. Rep. of Germany .
 764177  2/1955  United Kingdom .
1231859  5/1968  United Kingdom .

Primary Examiner—Mark Rosenbaum
Attorney, Agent, or Firm—Yount & Tarolli

[57] ABSTRACT

A nut having a plurality of thread convolutions is formed with a plurality of punches from a metal blank to eliminate time consuming tapping operations. To make the nut, a pair of punches are used to form recesses in opposite sides of the blank and to form projections which extend axially outwardly from the sides of the blank. The recesses are separated by a web which is shaped by another pair of punches to form an inner thread convolution. The two axially extending projections each contain a volume metal which is the same as the volume of metal contained in upper and lower thread convolutions. The upper and lower thread convolutions are formed by cold working the metal of the blank to eliminate the axial projections and form radially inwardly extending projections in the central opening in the blank.

32 Claims, 11 Drawing Figures

NUT AND METHOD OF FORMING THE SAME

BACKGROUND OF THE INVENTION

This invention relates to a nut and more specifically to a nut which is formed from a blank without tapping the blank.

A nut having only a single thread convolution which is formed by a pair of punches is disclosed in U.S. Pat. No. 2,832,972. The single thread convolution has an extent which is less than one turn. The thread convolution is formed by using a pair of punches. The punches force metal along the sides of a cylindrical opening through the center of a blank to flow radially inwardly into the opening. The resulting nut has only a single thread convolution which is formed by shearing metal progressively along the side of the central opening through the blank.

Nuts have also previously been formed by thread tapping operations. It has been suggested that the nuts which are formed by tapping operations could have thread convolutions which extend for less than a full turn (see U.S. Pat. No. 3,314,326). It has also been suggested that thread convolutions which extend for a full turn, could be used in association with thread convolutions which extend for less than a full turn (see U.S. Pat. Nos. 689,555 and 800,190).

SUMMARY OF THE PRESENT INVENTION

The present invention relates to a new and improved nut and the method by which it is made. The nut is formed from a blank using punches to cold work the metal of the blank to form an inner thread convolution and a pair of outer thread convolutions disposed on opposite sides of the inner thread convolution. In forming the inner thread convolution, the punches are used to form recesses which extend inwardly from opposite sides of the blank and are separated by a circular web. The formation of the inner thread convolution is completed by piercing the web and shaping the flanks of the inner thread convolution with a pair of punches.

Simultaneously with the formation of the recesses and the web, axial projections are formed on opposite sides of the blank. These axial projections each contain a volume of metal which is equal to the volume of metal in one of the outer thread convolutions. Punches are used to move the metal in the axial projections radially and axially inwardly into the opening in the nut blank to form the outer thread convolutions. Although it is preferred to form the inner and outer thread convolutions in the same nut blank, they could be formed in separate blanks if desired.

Accordingly, it is an object of this invention to provide a new and improved method of forming a nut having a plurality of thread convolutions and wherein an inner thread convolution is formed by cold working the metal of a blank with a first punch and an outer thread convolution is formed by cold working the metal of the blank with a second punch after the metal of the blank has been worked with the first punch to form the inner thread convolution.

Another object of this invention is to provide a new and improved method of forming a nut having a plurality of thread convolutions and wherein a first axial projection containing a volume of metal equal to the volume of metal in a first thread convolution is formed on one side of a blank and a second axial projection containing a volume of metal equal to the volume of metal in a second thread convolution is formed on a second side of the blank, the formation of the thread convolutions being completed by eliminating the axial projections and forming radially extending projections in the blank.

Another object of this invention is to provide a new and improved method of forming a nut having an internal thread convolution and wherein a pair of coaxial circular recesses are formed in opposite sides of a blank and are separated by a circular web, the thread convolution being formed from the metal of the web.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

The Nut

Figure 1:
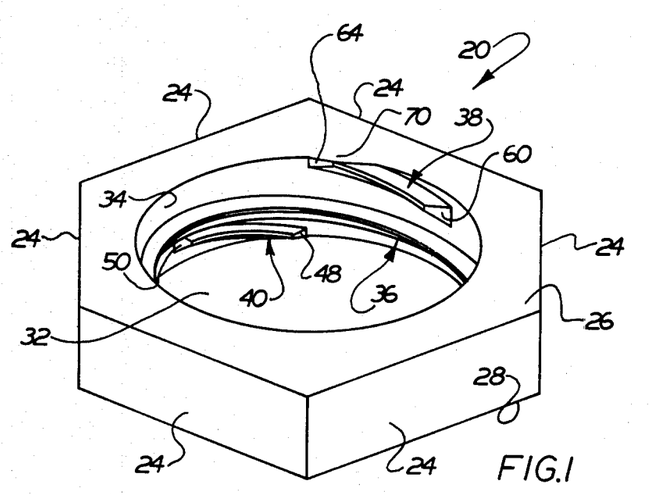
FIG. 1 is an illustration of a nut formed by the process of the present invention.
Figure 2:
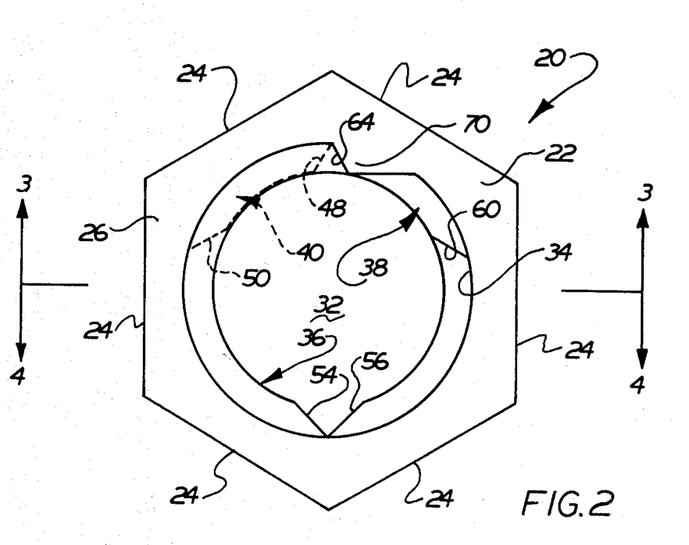
FIG. 2 is a top plan view of the nut of FIG. 1.

A nut 20 made by the process of the present invention is illustrated in FIG. 1 and includes a hexagonal body 22 having a plurality of wrenching flats or side surfaces 24 which extend between flat upper and lower surfaces 26 and 28 (FIGS. 1-4). Although the nut 20 has been shown in FIGS. 1-4 as having sharply defined corners, it is contemplated that the nut will have rounded corners. It should also be noted that although the top and bottom surfaces 26 and 28 of the nut have been shown as being flat and parallel to each other, the nut could have arcuately curved top and bottom surfaces if desired.

The nut 20 has a circular central opening 32 (FIGS. 1 and 2) with a cylindrical sidewall 34. An inner thread convolution 36 projects radially inwardly from the sidewall 34 (FIGS. 1-4). In addition, upper and lower thread convolutions 38 and 40 (FIGS. 1 and 3) extend radially inwardly from the sidewall 34. The inner thread convolution 36 extends for a complete turn, that is for a complete circle or 360 degrees. The upper and lower thread convolutions 38 and 40 extend for partial turns, that is for less than 360 degrees. In the illustrated embodiment of the invention, the upper and lower thread convolutions 38 and 40 extend for approximately 50 degrees. However, it is contemplated that the extent of the inner, upper and lower thread convolutions 36, 38 and 40 could be varied if desired.

The inner thread convolution 36 and the upper and lower thread convolutions 38 and 40 are part of a common helix. Thus, if the inner thread convolution 36 continued through a plurality of turns, it would include the upper and lower thread convolutions 38 and 40. Since the inner thread convolution 36 and upper and lower thread convolutions 38 and 40 are formed as part of a common helix, they all have the same helix angle or pitch angle which has been indicated at 44 in FIG. 3.

When the nut 20 is turned onto a mating external thread convolution having the same helix or pitch angle 44, an outer or beginning end portion 48 (see FIGS. 1-3) of the lower thread convolution 40 initially engages the external thread. As the nut 20 is turned onto the externally threaded member, the inner or upper end portion 50 of the lower thread convolution 40 moves into engagement with the external thread convolution. Continued rotation of the nut brings the lower end portion 54 (see FIG. 4) of the inner thread convolution 36 into engagement with the external thread convolution.

Continued turning movement of the nut 20 relative to the external thread convolution causes the external thread convolution to move into mating engagement with the internal thread convolution 36 throughout its extent. The area of initial mating engagement with the external thread convolution then moves past the upper end 56 (FIG. 4) of the inner thread convolution 36. Still further rotation of the nut 20 results in the inner or lower end 60 (FIG. 3) of the upper thread convolution 38 moving into engagement with the external thread convolution. Still further turning movement results in the area of initial engagement between the nut 20 and external thread convolution moving along the upper thread convolution 38 to the outer end portion 64 of the outer thread convolution. Since the lower thread convolution 40, inner thread convolution 36 and upper thread convolution 38 are all formed as part of a common helix and have the size and configuration of a standard internal thread convolution, the external thread convolution freely engages with each of the thread convolutions 40, 36 and 38 in turn.

Figure 3:
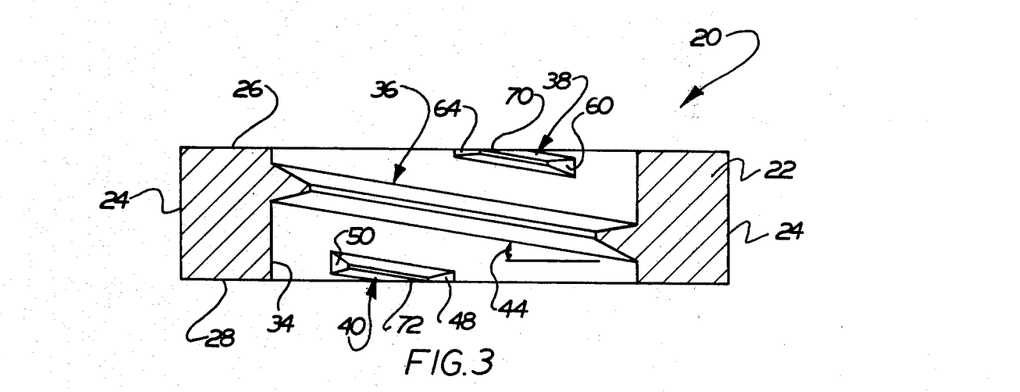
FIG. 3 is a sectional view (taken generally along the line 3—3 of FIG. 2) of half of the nut and illustrating the relationship between an inner thread convolution and upper and lower thread convolutions formed in the nut body.
Figure 4:
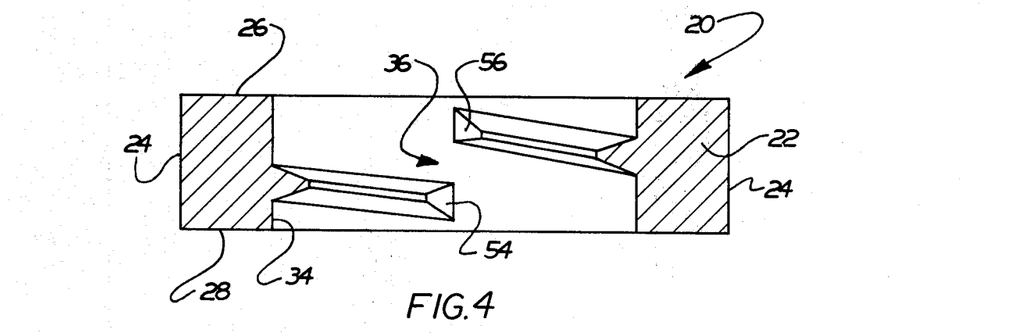
FIG. 4 is a plan view (taken generally along the line 4—4 of FIG. 2) of the half of the nut which is opposite from the half shown in FIG. 3 and further illustrating the construction of the inner thread convolution.

The opposite ends 54 and 56 (FIG. 4) of the inner thread convolution 36 are disposed in the central opening 32 of the nut body 22. The lower end 54 of the inner thread convolution 36 is relatively close to the lower or bottom surface 28 of the nut body 22 while the upper end 56 of the inner thread convolution 36 is disposed adjacent to the top or upper surface 26 of the nut body 22. Although the inner end portion 60 of the upper thread convolution 38 (see FIG. 1) is spaced from the top surface 26, the upper or outer end portion 64 of the upper thread convolution 38 intersects the upper surface 26 of the nut body 22 at a flat planar surface area 70. Similarly, the outer end portion 48 of the lower thread convolution 40 intersects the bottom surface 28 of the nut body at a flat planar surface area 72 (FIG. 3). By forming the outer portions 64 and 48 of the upper and lower thread convolutions 38 and 40 in this manner, the nut 20 can be easily started on an externally threaded member.

In the illustrated embodiment of the invention, the upper and lower thread convolutions 38 and 40 are disposed adjacent to the central portion of the inner thread convolution 36. Thus, the outer end 64 of the upper thread convolution 38 and the outer end 48 of the lower thread convolution 40 are disposed diametrically opposite from the ends 54 and 56 of the inner thread convolution 36 (see FIG. 2). This spatial relationship between the inner thread convolution 36 and the upper and lower thread convolutions 38 and 40 minimizes the distance from the inner end portion 60 of the upper thread convolution 38 and the upper surface 26 of the nut body and the distance from the inner end portion 50 of the lower thread convolution 40 and the bottom surface 28 of the nut body when the inner thread convolution has an extent which is equal to one full turn.

General Method of Making The Nut

Figure 5:
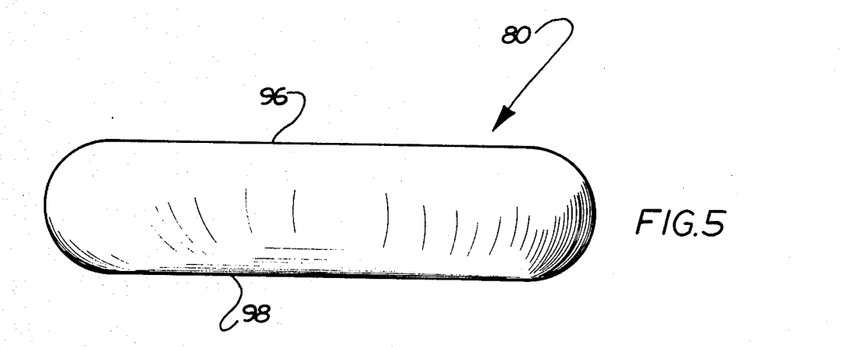
FIG. 5 is a side elevational view of a blank from which the nut of FIGS. 1-4 is formed.

In accordance with a feature of the present invention, the inner thread convolution 36 and upper and lower thread convolutions 38 and 40 of the nut 20 are formed by cold working or forging a metal blank 80 (see FIG. 5) without tapping the blank. The metal blank 80 has a generally circular configuration and is rounded at the corners. The external diameter of the blank 80 is less than the maximum diameter of the finished nut 20. Although the blank 80 has been shown in FIG. 5 as having an axial extent which is approximately the same as the axial extent of the finished nut 20, the blank may have an axial extent which is greater than or less than the axial extent of the finished nut 20.

During the formation of the nut 20, the circular blank 80 is expanded to form the hexagonal nut body 22 as the thread convolutions 36, 38 and 40 are formed in the nut body. The manner in which a circular blank can be cold worked to form a hexagonal nut body having a circular central opening which is subsequently tapped is well known. Therefore, the manner in which the circular blank is expanded outwardly to form the hexagonal nut body will not be discussed in detail in order to avoid prolixity of description.

When the blank 80 is to be formed into the nut 20, a plurality of punches or forging tools are used to shape the blank. The forging tools cold work the metal of the blank to form the nut body to the hexagonal configuration shown in FIGS. 1 and 2 during the formation of the central opening 32 and the thread convolutions 36, 38 and 40 in the central opening. By cold working or forging the metal of the blank 80 to form the nut 20, a tapping operation is eliminated. In addition, the cold working operation results in work hardening of the metal of the nut body to strengthen the thread convolutions which are formed in the nut body. By forming a plurality of thread convolutions 36, 38 and 40, the magnitude of the load to which the nut 20 can be subjected without stripping is increased.

Figure 6:
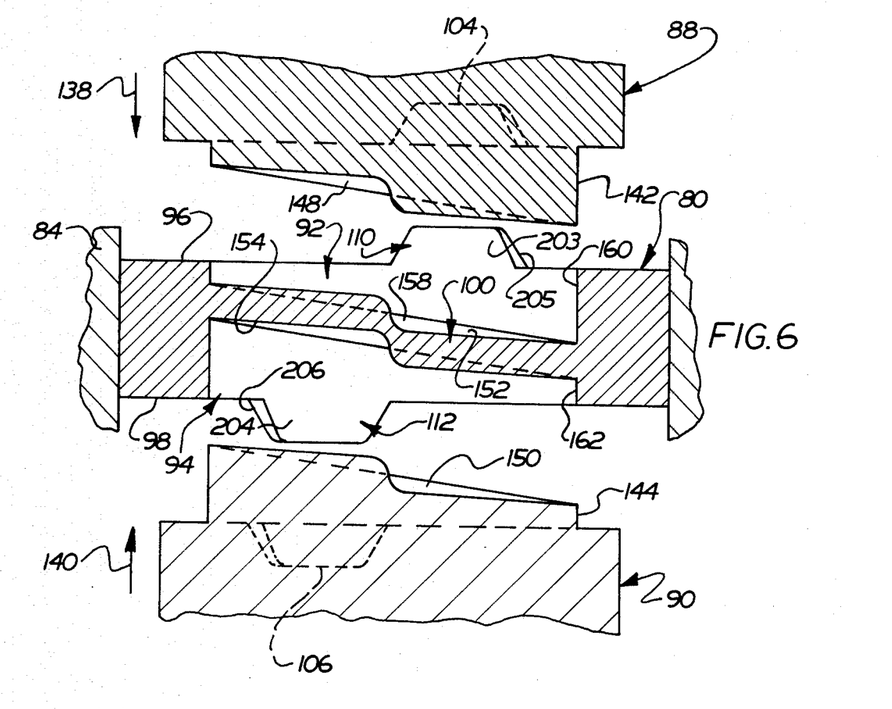
FIG. 6 is a fragmentary sectional view (taken generally along a line corresponding to the line 3—3 of FIG. 2) illustrating the relationship between half of the blank of FIG. 5 and a pair of punches after the punches have been used to form recesses in opposite sides of the blank and to form projections extending axially outwardly from opposite sides of the blank.

When a nut 20 is to be formed from the blank 80, the blank is inserted in a cavity of an outer die 84 (FIG. 6). The cavity in the die 84 has a generally hexagonal configuration conforming to the hexagonal configuration of the nut body 22.

Once the blank 80 has been placed in the die 84, upper and lower forging tools or punches 88 and 90 are simultaneously moved together to form a pair of circular recesses 92 and 94 which extend inwardly from upper and lower surfaces 96 and 98 of the blank 80. The generally cylindrical recesses 92 and 94 formed in the blank 80 are separated by a circular web 100 (see FIGS. 6 and 7). Simultaneously with the forming of the web 100, die cavities 104 and 106 in the punches 88 and 90 form axially extending projections 110 and 112 which extend axially outwardly from the upper and lower side surfaces 96 and 98 of the blank 80 (see FIG. 6).

Figure 8:
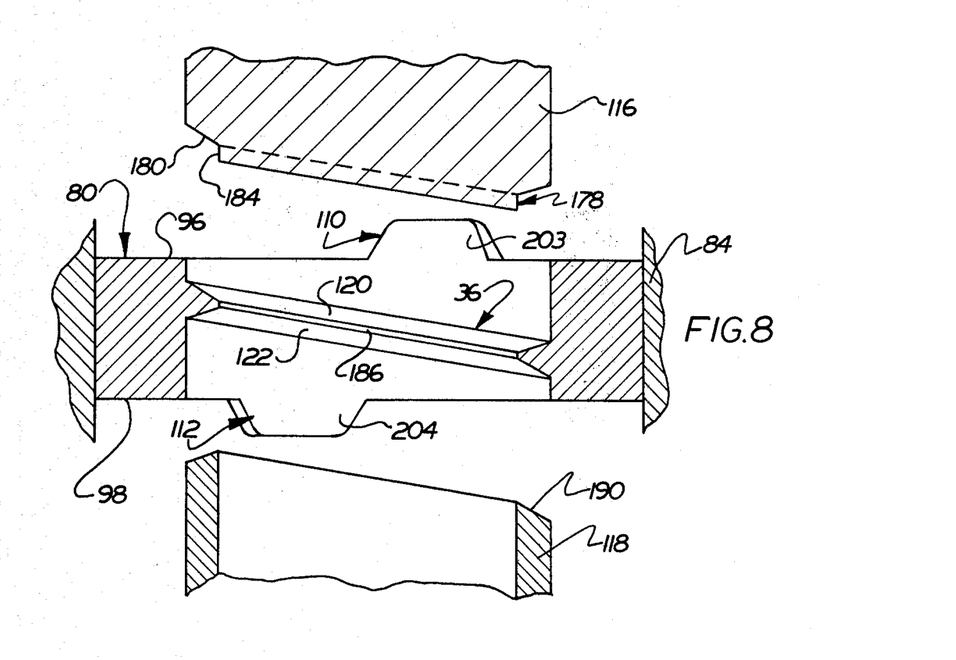
FIG. 8 is a fragmentary sectional view illustrating the relationship between the half of the blank shown in FIG. 6 and a second pair of punches after the punches have been used to form an inner thread convolution in an opening extending through the blank.
Figure 9:
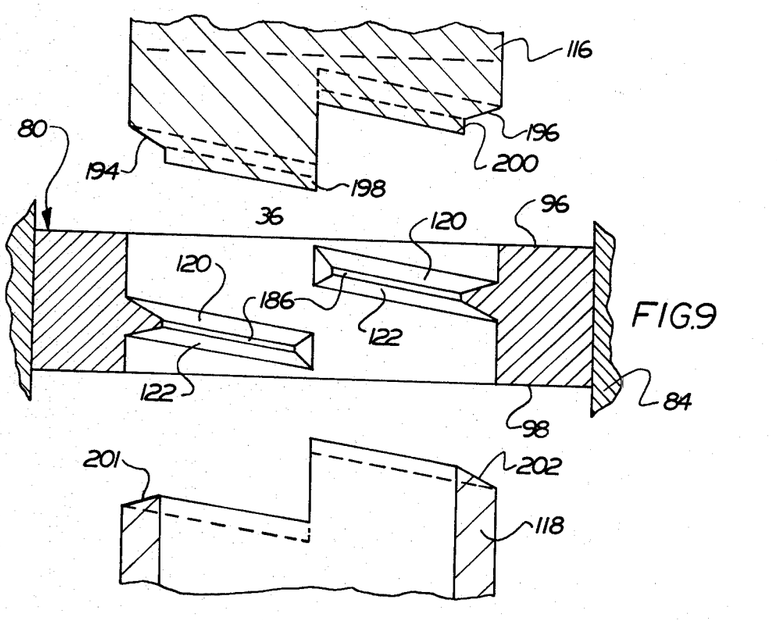
FIG. 9 is a fragmentary sectional view illustrating the relationship between the punches of FIG. 8 and the half of the blank which is opposite from the half of the blank shown in FIG. 8.

The formation of the inner thread convolution 36 is completed by using a pair of forging tools or punches 116 and 118 (FIGS. 8 and 9). The punches 116 and 118 remove a circular piece of material from the central portion of the circular web 100. Simultaneously with the removal of material from the central portion of the web 100, the punches 116 and 118 shape the upper and lower flank surfaces 120 and 122 of the inner thread convolution.

Figure 10:
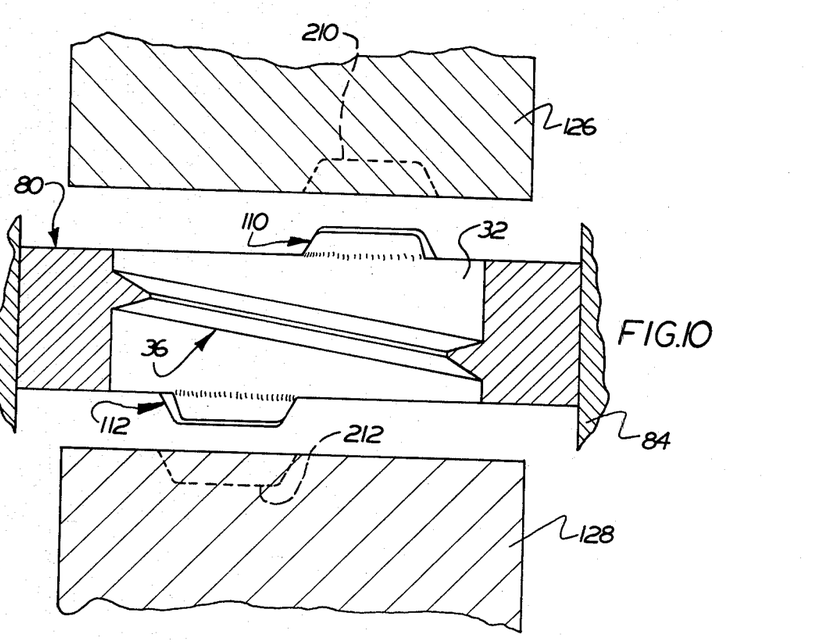
FIG. 10 is a fragmentary sectional view, illustrating the relationship between the half of the blank shown in FIGS. 6 and 8 and a third pair of punches which have partially deflected the axial projections on opposite sides of the nut blank into an opening extending through the central portion of the blank after formation of the inner thread convolution.
Figure 11:
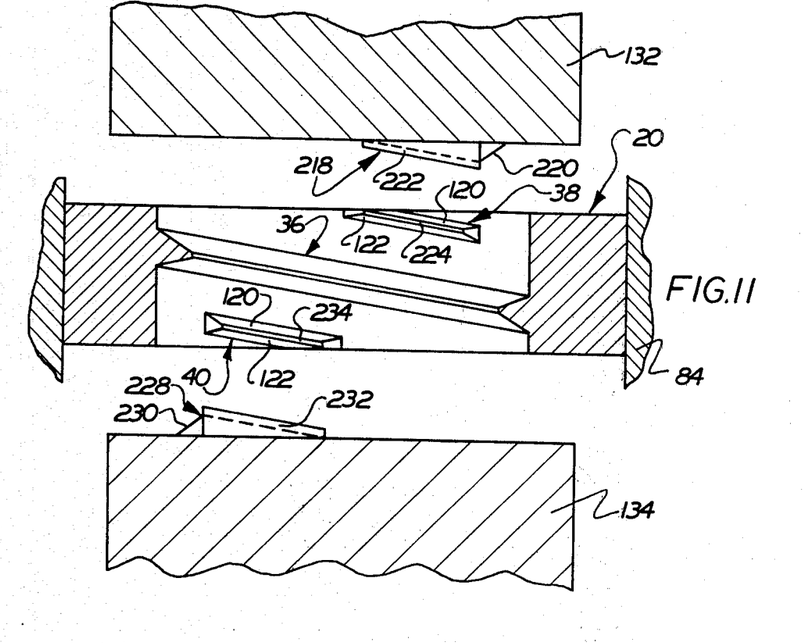
FIG. 11 is a fragmentary sectional view of the half of the nut shown in FIG. 10 and illustrating the relationship between outer thread convolutions and a fourth pair of punches which are used to complete the formation of the outer thread convolutions.

After the inner thread convolution 36 has been formed between the upper and lower surfaces 96 and 98 of the blank 80 in the manner shown in FIGS. 8 and 9, the upper and lower thread convolutions 38 and 40 are formed in the manner shown in FIGS. 10 and 11. Thus, a pair of forging tools or punches 126 and 128 are used to bend the axial projections 110 axially and radially inwardly into the circular central opening 32 in the nut blank 80. The formation of the upper and lower thread convolutions 38 and 40 is then completed by a pair of forging tools or punches 132 and 134 (FIG. 11).

Thus by using a series of punches, the nut 20 is formed from the blank 80 by a cold working or forging process without tapping the blank. Since the various pairs of punches can be set up at different stations of a stamping machine, it is possible to forge the inner thread convolution 36 and upper and lower thread convolutions 38 and 40 at a relatively high speed without the necessity of moving a rotating tap into and out of the nut blank. Although it is preferred to form the inner, upper and lower thread convolutions 36, 38 and 40 in a single nut blank 80 to provide the nut 20 with a relatively large load carrying capacity, the thread convolutions could be formed separately if desired. Thus, a nut could be formed with a single inner thread convolution corresponding to the thread convolution 36 or could be formed with a plurality of outer thread convolutions corresponding to the thread convolutions 38 and 40.

Formation of the Inner Thread Convolution

To form the inner thread convolution 36, the web 100 and axial projections 110 and 112 (FIG. 6) are formed first. This is accomplished by the two punches 88 and 90 which are simultaneously moved together, that is in the direction of the arrows 138 and 140 in FIG. 6. This clamps the blank 80 between the punches. As the punches are forced into opposite sides of the blank 80, circular leading end sections 142 and 144 of the identical punches 88 and 90 extrude the metal of the nut blank 80 radially outwardly. This at least partially forms the hexagonal side surfaces 24 of the nut body and the axially extending projections 110 and 112. The volume of metal in the two axial projections 110 and 112 is equal to the volume of metal contained in the identical upper and lower thread convolutions 38 and 40.

The metal required to form the axial projections 110 and 112 and to expand the nut body is provided by the formation of the generally cylindrical recesses 92 and 94 in opposite sides of the nut body. The cylindrical recesses 92 and 94 are formed by circular leading ends 142 and 144 of the punches 88 and 90. In addition, end faces 148 and 150 on the punches 88 and 90 form the identical opposite side surfaces 152 and 154 on a circular web 100.

The rim of the imperforate circular web 100 includes a semi-circular side section 158 (FIG. 6) which extends radially inwardly from cylindrical sidewalls 160 and 162 of the recesses 92 and 94. The semi-circular rim section 158 is skewed relative to the flat upper and lower surfaces 96 and 98 of the blank 80 at an angle which is equal to the helix angle 44 (see FIG. 3) of the inner thread convolution 36.

An arcuate lower section 166 (FIG. 7) of the rim of the web 100 is formed as a continuation of the right portion (as viewed in FIG. 6) of the semi-circular side section 158. Thus, the lower section 166 of the rim of the web 100 has an extent of approximately 90 degrees and extends inwardly from the side surfaces 160 and 162 of the recesses 92 and 94. Since the lower section 166 is formed as a continuation of the semi-circular side section 158 of FIG. 6, the lower section 166 is skewed relative to the top and bottom surfaces 96 and 98 of the blank 80 at the helix angle 44 of the inner thread convolution 36 (see FIG. 3).

Similarly, an arcuate upper section 170 (FIG. 7) of the rim of the web 100 is formed as a continuation of the left portion (as viewed in FIG. 6) of the semi-circular side section 158. The upper ring section 170 of the web 100 has an extent of approximately 90 degrees and extends radially inwardly from the surfaces 160 and 162 of the recesses 92 and 94. The upper section 170 (FIG. 7) is skewed relative to the top and bottom surfaces 96 and 98 of the blank 80 at the helix angle 44 (see FIG. 3) of the inner thread convolution 36.

Figure 7:
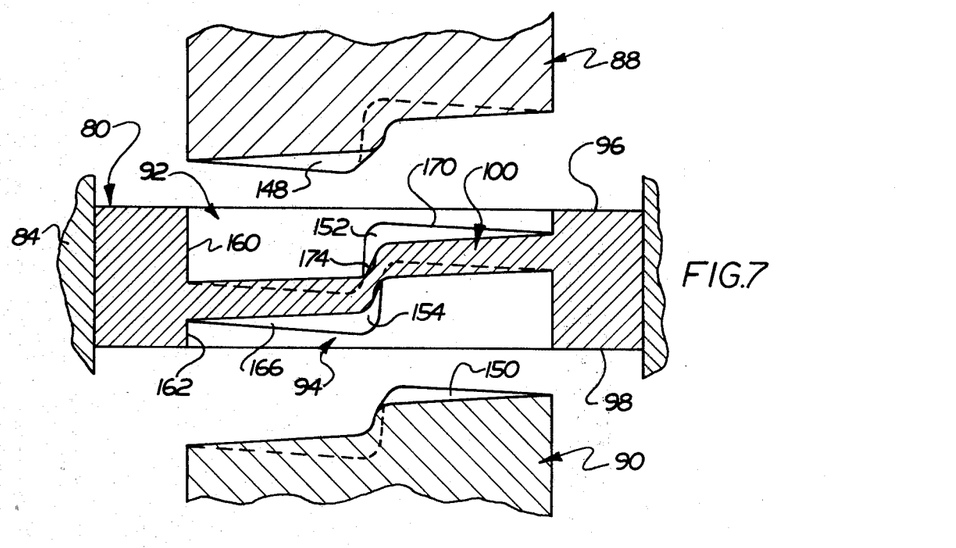
FIG. 7 is a fragmentary sectional view, (taken generally along a line corresponding to the line 4—4 of FIG. 2) and illustrating the relationship between the punches and the half of the blank which is opposite from the half shown in FIG. 6.

The upper and lower sections 166 and 170 of the rim of the web 100 are interconnected by an axially extending connector section 174 (FIG. 7). The axially extending connector section 174 projects from the side surfaces 160, 162 of the recesses 92 and 94 to further define the rim of the web 100. Thus, the web 100 has a circular rim which is made up of the semi-circular side section 158 (FIG. 6) and the two end sections 166 and 170 (FIG. 7). The lower end of the rim section 166 and the upper end of the rim section 170 are interconnected by the generally axially extending connector section 174. The imperforate circular web 100 extends between the rim sections 158, 166, 170 and 174 (FIGS. 6 and 7) to separate the upper recess 92 from the lower recess 94.

The inner thread convolution 36 is formed from the web 100. Therefore, the rim portion of the web 100 has a configuration which corresponds to the general configuration of the inner thread convolution 36. Thus, the semi-circular side section 158 of the web 100 corresponds to the portion of the inner thread convolution shown in FIG. 3 while the end sections 154 and 170 correspond to the portion of the inner thread convolution 36 shown in FIG. 4. By forming the rim or side sections of the web 100 so that they are skewed at the helix angle of the inner convolution 36, the extent to which the metal in the web 100 must be cold worked to form the inner thread convolution tends to be minimized.

In order to form the inner thread convolution 36 from the web 100, the punches 116 and 118 (see FIGS. 8 and 9) cut away a circular central portion of the web 100 and shape the side or rim sections 158, 166 and 170 of the web. Thus, the upper punch 116 has a circular leading end section 178 which cooperates with the hollow tubular lower punch 118 to cut out the center of the web 100. In addition, the upper punch 116 has a semi-circular radially inwardly sloping side section 180 (see FIG. 8) which shapes the portion of the upper flank surface 120 which is disposed on the semi-circular side section 158 (see FIG. 6) of the web 100. In addition, the leading end 178 of the punch 116 and semi-circular surface 184 which shapes a crest surface 186 of this portion of the inner thread convolution 36. Similarly, the lower punch 118 has a semi-circular section 190 which shapes the lower side of the semi-circular side portion 158 (see FIG. 6) of the web 100 to form the semi-circular central portion of the flank surface 122 shown in FIG. 8.

In addition, the upper punch 116 has a pair of arcuate sections 194 and 196 (FIG. 9) which shape the arcuate rim sections 166 and 170 of the web 100 to form the opposite ends of the inner thread convolution 36. The leading end of the punch 116 has arcuate segments 198 and 200 which form the crest portion 186 of the part of the thread convolution shown in FIG. 9. Similarly, the lower punch 118 has sloping arcuate side surfaces 201 and 202 which form the flanks 122 of the portion of the thread convolution 36 shown in FIG. 9.

Formation of the Upper and Lower Thread Convolutions

The formation of the upper and lower thread convolutions 38 and 40 is initiated simultaneously with initiation of the formation of the inner thread convolution 36. Thus, the punches 88 and 90 (FIG. 6) have recesses 104 and 106 which form the axial projections 110 and 112 simultaneously with the formation of the web 100. The axial projections 110 and 112 extend along the upper and lower ends of the nut body for arcuate distances which are equal to the arcuate extents of the upper and lower thread convolutions. Thus, the upper projection 110 has an arcuate extent which is the same as the arcuate extent of the upper thread convolution 38, that is 50 degrees. Similarly, the lower projections 112 has an arcuate extent which is equal to the arcuate extent of the lower thread convolution, that is 50 degrees. It should be understood that the arcuate extent of the projections 110 and 112 could differ from the foregoing value and could differ from each other in accordance with variations in the arcuate extent of the upper and lower thread convolutions 38 and 40.

The upper and lower axial projections 110 and 112 are formed with arcuate inner surfaces 203 and 204 which form continuations of the cylindrical side surfaces 160 and 162 of the recesses 92 and 94. The axial projections 110 and 112 have arcuate outer side surfaces 205 and 206 (FIG. 6) which slope axially outwardly and radially inwardly toward the inner side surfaces 203 and 204. The volume of metal contained in each of the projections 110 and 112 is equal to the volume of metal contained in the corresponding one of the thread convolutions 38 and 40.

Once the inner thread convolution 36 has been completely formed in the manner shown in FIGS. 8 and 9, the axially extending projections 110 and 112 (FIG. 8) are eliminated to form the radially inwardly projecting upper and lower thread convolutions 38 and 40. Thus, the two punches 126 and 128 (see FIG. 10) are provided with a pair of recesses 210 and 212 which engage the axially extending projections 110 and 112 to bend them radially and axially inwardly. It should be noted that the punches 126 and 128 do not enter the circular opening 32 in the blank 80 as do the punches which form the center thread convolution 36.

Once the axial projections have been initially deflected inwardly by the punches 126 and 128, another set of punches 132 and 134 cold work the metal contained in the projections 110 and 112 to complete the formation of the radially inwardly projecting inner and outer thread convolutions 38 and 40. Since the axial projections 110 and 112 were initially formed with the same volume of metal as is contained in the radially inwardly projecting upper and lower thread convolutions 38 and 40, the punches 132 and 134 can cold work the metal in the axially extending projections 110 and 112 to form the inner and outer thread convolutions 38 and 40 with a minimum of cold working of the blank 80. The upper punch 132 has a leading end section 218 with a sloping surface 220 which shapes the upper flank surface 120 of the upper thread convolution 38. An axially extending arcuate section 222 of the projection 220 shapes the crest 224 of the upper thread convolution 38. The lower flank 122 of the upper thread convolution 38 is unrestrained as pressure is applied against the upper flank surface 120. Therefore, the lower flank surface 122 is formed by a free flow of metal which results from the application of pressure against the upper flank surface 120 of the upper thread convolution 38 by the punch 132.

The lower punch 134 is provided with a leading end portion 228 which has the same configuration as the leading end portion 218 of the punch 132. The leading end portion 228 of the punch 134 forms the lower thread convolution 40. Thus, the leading end portion 228 of the lower punch 134 has an arcuate side surface 230 which shapes a lower flank surface 122 of the lower thread convolution 40. In addition, the leading end portion 228 of the punch 134 has an arcuate axially projecting section 232 which shapes the crest 234 of the lower thread convolution 40. The upper flank surface 120 of the lower thread convolution 40 is unconstrained as the pressure is applied against the outer or lower flank surface 122. Therefore, the inner flank surface 120 is formed by a free flow of metal which results from the application of pressure against the outer flank surface 122 of the lower thread convolution 40.

Summary

In view of the foregoing it is apparent that the present invention relates to a new and improved nut 20 and the method by which it is made. The nut 20 is formed from a blank 80 using punches to cold work the metal of the blank to form an inner thread convolution 36 and a pair of outer thread convolutions 38 and 40 disposed on opposite sides of the inner thread convolution. In forming the inner thread convolution 36, the punches 88 and 90 are used to form recesses 92 and 94 which extend inwardly from opposite sides of the blank and are separated by a circular web 100. The formation of the inner thread convolution 36 is completed by piercing the web 100 and shaping the flanks 120 and 122 of the inner thread convolution 36 with a pair of punches 116 and 118.

Simultaneously with the formation of the recesses 92 and 94 and the web 100, axial projections 110 and 112 are formed on opposite sides of the blank. The axial projections 110 and 112 each contain a volume of metal which is equal to the volume of metal in one of the outer thread convolutions 38 or 40. Punches 126, 128, 132 and 134 are used to move the metal in the axial projections 110 and 112 radially and axially inwardly into the opening in the nut blank 80 to form the outer thread convolutions 38 and 40. Although it is preferred to form the inner and outer thread convolutions 38 and 40 in the same nut blank 80, they could be formed in separate blanks if desired.

Having described one specific preferred embodiment of the invention, the following is claimed:

1. A method of forming a nut having a plurality of thread convolutions, said method comprising the steps of providing a metal blank, forming an inner thread convolution in a central portion of the blank, said step of forming the inner thread convolution including the step of cold working the metal of the blank with a first punch, said step of forming an inner thread convolution further including the step of forming an opening in the blank in which the inner thread convolution is formed, and forming an outer thread convolution in a portion of the blank which is axially outwardly of the inner thread convolution, said step of forming an outer thread convolution including the step of cold working the metal of the blank with a second punch after performing said step of cold working the metal of the blank with a first punch, said step of forming an outer thread convolution further including the steps of forming a projection which extends outwardly from a side surface of the blank during said step of forming an inner thread convolution and moving the metal in the projection into the opening in the blank after forming the inner thread convolution.

2. A method as set forth in claim 1 wherein said step of forming an inner thread convolution includes the step of shaping a flank surface of the inner thread convolution with the first punch by moving the first punch toward the blank in a first direction and subsequently moving the first punch away from the blank in a second direction which is opposite from the first direction, said step of forming an outer thread convolution including the step of shaping a flank surface of the outer thread convolution with the second punch by moving the second punch toward the blank in the first direction and subsequently moving the second punch away from the blank in the second direction.

3. A method as set forth in claim 1 wherein said step of providing a blank includes the step of providing a blank having opposite side surfaces, said step of forming an inner thread convolution including the steps of forming a first recess extending inwardly from the first side surface of the blank and forming a second recess extending inwardly from the second side surface, said steps of forming first and second recesses including the step of forming a web disposed between and separating the first and second recesses, said step of forming an inner thread convolution further including the step of forming a circular opening in the web.

4. A method as set forth in claim 3 wherein said step of forming a web includes the step of forming a side surface area which extends transversely to the opposite sides of the blank at a first angle, said step of forming an inner thread convolution including the step of forming a thread convolution having a helix angle which is equal to the first angle.

5. A method as set forth in claim 3 wherein said step of forming a web includes the step of forming a web having a first portion which is disposed a first distance from one of the side surfaces of the blank and a second portion which is disposed a second distance from the one side surface of the blank, the second distance being greater than the first distance.

6. A method as set forth in claim 3 wherein said step of forming a web includes the step of forming a first section which is skewed relative to one of the side surfaces of the blank, forming a second section which is skewed relative to the one side surface of the blank and is offset from the first section along a central axis of the blank, and forming a connector section which extends between the first and second sections of the web.

7. A method as set forth in claim 6 wherein said step of forming the inner thread convolution includes the step of forming first and second end portions of the inner thread convolution by removing the connector section from the web.

8. A method as set forth in claim 1 wherein said outer thread convolution is disposed adjacent to a first side of the blank, said method further including the step of forming a second outer thread convolution in a portion of the blank which is axially outwardly of the inner thread convolution and is disposed adjacent to a second side of the blank opposite from the first side by further cold working the metal of the blank with a punch after performing said step of forming an inner thread convolution.

9. A method as set forth in claim 1 wherein said step of cold working the metal of the blank with the first punch includes the step of moving the first punch a first distance into the blank while holding the first punch against rotation relative to the blank, said step of cold working the metal of the blank with the second punch includes the step of moving the second punch a second distance into the blank while holding the second punch against rotation relative to the blank, said first distance being greater than said second distance.

10. A method of forming a nut having a plurality of thread convolutions, said method comprising the steps of providing a metal blank having a central axis and first and second side surfaces disposed on opposite sides of the blank and extending transversely to the central axis of the blank, working the metal of the blank to form a first projection extending axially outwardly from the first side surface of the blank and containing a first volume of metal, working the metal of the blank to form a second projection extending axially outwardly from the second side surface of the blank and containing a second volume of metal, forming a circular central opening extending axially through the blank between the first and second side surfaces, forming a first thread convolution adjacent to the first side surface of the blank by eliminating the first projection and forming a third projection which extends radially into the central opening in the blank and contains a volume of metal equal to the first volume, and forming a second thread convolution adjacent to the second side of the blank by eliminating the second projection and forming a fourth projection which extends radially into the central opening in the blank and contains a volume of metal equal to the second volume.

11. A method as set forth in claim 10 further including the step of forming an inner thread convolution in a central portion of the blank between the first and second thread convolutions.

12. A method as set forth in claim 11 wherein said step of forming a first thread convolution includes the step of cold working the metal of the blank with a first punch, said step of forming a second thread convolution including the step of cold working the metal of the blank with a second punch, said step of forming an inner thread convolution including the step of cold working the metal of the blank with third and fourth punches.

13. A method as set forth in claim 10 wherein said step of eliminating the first projection and forming a third projection includes the step of forcing the material in the first projection to move axially and radially inwardly into the central opening in the blank, said step of eliminating the second projection and forming a fourth projection including a step of forcing the material in the second projection to move axially and radially inwardly into the central opening in the blank.

14. A method as set forth in claim 10 wherein said step of forming a first thread convolution by eliminating the first projection and forming the third projection includes the step of shaping a first flank surface of the first thread convolution by applying a force against the metal of the blank with a first punch, said step of forming a second thread convolution by eliminating the second projection and forming a fourth projection includes the step of shaping a first flank surface of the second thread convolution by applying a force against the metal of the blank with a second punch.

15. A method as set forth in claim 14 wherein said step of forming a second thread convolution includes the step of forming a second flank surface of the second thread convolution by allowing the metal of the blank to flow freely in an unrestrained manner under the influence of forces applied against the metal of the blank with the second punch.

16. A method of forming a nut having an internal thread convolution with a predetermined helix angle, said method comprising the steps of providing a metal blank having first and second side surfaces, forming a first circular recess extending inwardly from the first side surface of the blank, forming a second circular recess extending inwardly from the second side surface of the blank, the second circular recess having the same diameter as and being disposed in a coaxial relationship with the first circular recess, said steps of forming first and second circular recesses including the step of forming a circular web separating the first and second recesses, said step of forming a web including the step of forming a central side section which has a semi-circular configuration and extends transversely to the first and second side surfaces of the metal blank at an acute angle equal to the helix angle, forming a first arcuate end section which extends toward the first side surface of the metal blank from an end of the central side section which is closest to the first side surface of the metal blank and which forms a continuation of the central side section, and forming a second arcuate end section which extends toward the second side surface of the metal blank from an end of the central side section which is closest to the second side surface of the metal blank and which forms a continuation of the central side section, thereafter forming in the web a circular central opening which is at least partially defined by the central side section and the first and second end sections of the web.

17. A method as set forth in claim 16 wherein said step of forming a web further includes the step of forming a connector section which extends between and interconnects the first and second arcuate end sections, said step of forming a circular central opening in the web including the step of removing the connector section from the web.

18. A method as set forth in claim 16 further including the step of shaping the metal of the central side section and first and second end sections of the web to form a continuously curving flank surface of the internal thread convolution.

19. A nut having a plurality of thread convolutions and made from a metal blank by the process of working the metal of the blank to form a first projection extending axially outwardly from a first side surface of the blank and containing a first volume of metal, working the metal of the blank to form a second projection extending axially outwardly from the second side surface of the blank and containing a second volume of metal, forming a circular opening extending axially through the blank between the first and second side surface, forming a first thread convolution adjacent to the first side surface of the blank by eliminating the first projection and forming a third projection which extends radially into the central opening in the blank and contains a volume of metal equal to the first volume, and forming a second thread convolution adjacent to the second side of the blank by eliminating the second projection and forming a fourth projection which extends radially into the central opening in the blank and contains a volume of metal equal to the second volume.

20. A nut as set forth in claim 19 wherein the step of eliminating the first projection and forming a third projection includes the step of forcing the material in the first projection to move axially and radially inwardly into the central opening in the blank, said step of eliminating the second projection and forming a fourth projection including the step of forcing the material in the second projection to move axially and radially inwardly into the opening in the blank.

21. A nut as set forth in claim 19 wherein said process further includes forming an inner thread convolution in a central portion of the blank between the first and second thread convolutions.

22. A nut having an internal thread convolution with a predetermined helix angle and made from a metal blank having first and second side surfaces by a process of forming a first circular recess extending inwardly from the first side surface of the blank, forming a second circular recess extending inwardly from the second side surface of the blank, the second circular recess having the same diameter as and being disposed in a coaxial relationship with the first circular recess, said steps of forming first and second circular recesses including the step of forming a circular web separating the first and second recesses, said step of forming a web including the step of forming a central side section which has a semi-circular configuration and extends transversely to the first and second side surfaces of the metal blank at an acute angle equal to the helix angle, forming a first arcuate end section which extends toward the first side surface of the metal blank from an end of the central side section which is closest to the first side surface of the metal blank and which forms a continuation of the central side section, and forming a second arcuate end section which extends toward the second side surface of the metal blank from an end of the central side section which is closest to the second side surface of the metal blank and which forms a continuation of the central side section, thereafter forming in the web a circular central opening which is at least partially defined by the central side section and the first and second end sections of the web.

23. A method of forming a nut having a plurality of thread convolutions having a predetermined helix angle, said method comprising the steps of providing a metal blank having first and second side surfaces, forming an inner thread convolution in a central portion of the blank, said step of forming the inner thread convolution including the steps of using first and second punches to form a first recess extending inwardly from the first side surface of the blank and a second recess extending inwardly from the second side surface of the blank, said steps of forming first and second recesses including the step of forming a web disposed between and separating the first and second recesses, said step of forming a web includes the step of forming the web with a side surface area which extends transversely to the opposite sides of the blank at the predetermined helix angle, said step of forming an inner thread convolution further including the step of forming a circular opening in the web, and forming an outer thread convolution in a portion of the blank which is axially outwardly of the inner thread convolution, said step of forming an outer thread convolution including the step of cold working the metal of the blank with a third punch after performing said steps of forming first and second recesses.

24. A method as set forth in claim 23 wherein said step of forming a web includes the step of forming a web having a first portion which is disposed a first distance from one of the side surfaces of the blank and a second portion which is disposed a second distance from the one side surface of the blank, the second distance being greater than the first distance.

25. A method as set forth in claim 23 wherein said step of forming a web includes the step of forming a first section which is skewed at the predetermined helix angle relative to one of the side surfaces of the blank, forming a second section which is skewed at the predetermined helix angle relative to the one side surface of the blank and is offset from the first section along a central axis of the blank, and forming a connector section which extends between the first and second sections of the web.

26. A method as set forth in claim 25 wherein said step of forming the inner thread convolution includes the step of forming first and second end portions of the inner thread convolution by removing the connector section from the web.

27. A method as set forth in claim 23 wherein said outer thread convolution is disposed adjacent to a first side of the blank, said method further including the step of forming a second outer thread convolution in a portion of the blank which is axially outwardly of the inner thread convolution and is disposed adjacent to a second side of the blank opposite from the first side by further cold working the metal of the blank with a fourth punch after performing said steps of forming first and second recesses.

28. A nut having an internal thread convolution with a predetermined helix angle and made from a metal blank having first and second side surfaces by a process of forming a first circular recess extending inwardly from the first side surface of the blank, forming a second circular recess extending inwardly from the second side surface of the blank, said steps of forming first and second circular recesses including the step of forming a circular web separating the first and second recesses, said step of forming a web including the step of forming a central side section which has a semi-circular configuration and extends transversely to the first and second side surfaces of the metal blank at an acute angle equal to the helix angle, forming a first arcuate end section which extends toward the first side surface of the metal blank from an end of the central side section which is closest to the first side surface of the metal blank and which forms a continuation of the central side section, forming a second arcuate end section which extends toward the second side surface of the metal blank from an end of the central side section which is closest to the second side surface of the metal blank and which forms a continuation of the central side section, and forming a connector section which extends between the first and second end sections and which extends transversely to the first and second side surfaces of the metal blank at an angle which is different than the helix angle, and forming in the web a circular central opening which is at least partially defined by the central side section and the first and second end sections of the web, said step of forming the central opening including the step of removing the connector section from the web.

29. A method of forming a nut having a plurality of thread convolutions, said method comprising the steps of providing a metal blank having first and second side surfaces, forming a central thread convolution, said step of forming a central thread convolution including the steps of cold working the metal of the blank with a first punch to form a first circular recess having a first cylindrical sidewall extending inwardly from the first side surface of the blank and cold working the metal of the blank with a second punch to form a second circular recess having a second cylindrical side wall extending inwardly from the second side surface of the blank, subsequently forming a first outer thread convolution adjacent to the first side surface of the blank and adjacent to a first axial side of the central thread convolution, and forming a second outer thread convolution adjacent to the second side surface of the blank and adjacent to a second axial side of the central thread convolution opposite from the first axial side of the central thread convolution, said step of forming the first outer thread convolution including cold working the metal of the blank with a third punch to flow metal radially inwardly at a portion of the first cylindrical sidewall adjacent to the first side surface of the blank, and said step of forming a second outer thread convolution including cold working the metal of the blank with a fourth punch to flow metal radially inwardly at a portion of the second cylindrical sidewall adjacent to the second side surface of the blank.

30. A method as set forth in claim 29 wherein said step of cold working the metal of the blank with a third punch includes flowing metal axially and radially into the first recess and said step of cold working the metal of the blank with a fourth punch includes flowing metal axially and radially into the second recess.

31. A nut having a plurality of thread convolutions and made from a metal blank by the process of forming an inner thread convolution in a central portion of the blank, said step of forming an inner thread convolution including cold working the metal of the blank with first and second punches, forming a first outer thread convolution between a first side of the blank and the inner thread convolution, said step of forming a first outer thread convolution including cold working the metal of the blank with a third punch, said step of forming a first outer thread convolution further includes the steps of forming a first projection which extends outwardly from the first side of the blank during said step of forming the inner thread convolution and moving the metal in the first projection into an opening in the blank after forming the inner thread convolution, and forming a second outer thread convolution between a second side of the blank and the inner thread convolution, said step of forming a second outer thread convolution including the step of cold working the metal of the blank with a fourth punch, said step of forming a second outer thread convolution further includes the steps of forming a second projection which extends outwardly from the second side of the blank during said step of forming the inner thread convolution and moving the metal in the second projection into the opening in the blank after forming the inner thread convolution.

32. A method of forming a nut having a plurality of thread convolutions having a predetermined helix angle, said method comprising the steps of providing a metal blank having first and second side surfaces, forming an inner thread convolution in a central portion of the blank, said step of forming the inner thread convolution including the steps of using first and second punches to form a first recess extending inwardly from the first side surface of the blank and a second recess extending inwardly from the second side surface of the blank, said steps of forming first and second recesses including the step of forming a web disposed between and separating the first and second recesses, said step of forming a web includes the step of forming the web with a side surface area which extends transversely to the opposite sides of the blank at the predetermined helix angle, said step of forming an inner thread convolution further including the step of forming a circular opening in the web, and forming an outer thread convolution in a portion of the blank which is axially outwardly of the inner thread convolution, said step of forming an outer thread convolution including the steps of cold working the metal of the blank with a third punch after performing said steps of forming first and second recesses, forming a projection which extends outwardly from a side surface of the blank during said step of forming a first recess, and subsequently moving the metal in the projection into the first recess.

* * * * *